United States Patent [19]

Brown et al.

[11] 4,444,292

[45] Apr. 24, 1984

[54] METHOD AND APPARATUS FOR LUBRICATING A MACHINE

[75] Inventors: Cloyce L. Brown, Bainbridge; Darrell Tanner, Alma, both of Ga.

[73] Assignee: Standard Oil Company (Indiana), Chicago, Ill.

[21] Appl. No.: 292,294

[22] Filed: Aug. 12, 1981

[51] Int. Cl.³ .............................................. D03J 1/00
[52] U.S. Cl. ...................................... 184/6; 139/1 R; 139/45; 184/6.4; 184/6.22; 184/6.24; 184/6.28; 184/27 R
[58] Field of Search ................... 184/1 E, 6, 6.4, 6.21, 184/6.22, 6.24, 6.28, 7 R, 7 C, 7 CR, 7 D, 7 E, 7 F, 12, 15 R, 26, 27 E, 32, 34, 104 R, 27 R; 188/282, 285; 139/1 R, 45, 127 P, 436; 66/8

[56] References Cited

U.S. PATENT DOCUMENTS

| | | | |
|---|---|---|---|
| 2,072,180 | 3/1937 | Paton | 184/6.4 |
| 2,684,732 | 7/1954 | Harter | 184/7 F |
| 3,231,046 | 1/1966 | Ohrnberger | 184/7 R |
| 3,270,836 | 9/1966 | Rickley | 184/6.4 |
| 3,587,251 | 6/1971 | Vincoli | 184/6 X |
| 3,618,712 | 11/1971 | Casey | 184/6.28 |
| 3,814,141 | 6/1974 | Iribe et al. | 139/127 P |
| 3,895,689 | 7/1975 | Swearingen | 184/6.4 |
| 3,995,450 | 12/1976 | Rozett | 66/8 |
| 3,996,973 | 12/1976 | Strauss et al. | 139/436 |
| 4,040,504 | 8/1977 | Smith | 184/1 E |
| 4,205,708 | 6/1980 | Burgbacher | 139/45 X |

FOREIGN PATENT DOCUMENTS

| | | | |
|---|---|---|---|
| 183034 | 8/1955 | Fed. Rep. of Germany | 188/285 |
| 2041994 | 9/1980 | United Kingdom . | |

Primary Examiner—David H. Brown
Assistant Examiner—John E. Griffith, Jr.
Attorney, Agent, or Firm—David E. Boone; William T. McClain; William H. Magidson

[57] ABSTRACT

A method and apparatus for lubricating a machine is provided. In an embodiment a method is provided for generating pressure in a lubricating liquid and providing said liquid to a lubricating station at predetermined intervals. In another embodiment an apparatus is provided for pressurizing lubricating liquid in a reservoir and directing said liquid to a lubricating station.

16 Claims, 3 Drawing Figures

METHOD AND APPARATUS FOR LUBRICATING A MACHINE

This invention relates to a method and apparatus for lubricating a machine. More particularly, this invention relates to a method and apparatus for delivering liquid lubricant to at least one lubricating station in a textile weaving machine such as a Sulzer loom.

In machines it is necessary to provide lubrication to the moving parts in order to minimize wear and provide for smooth operation. This is particularly true with textile weaving machines where there are many rapidly moving parts involved in the weaving operation. A common method of providing this lubrication is through the use of an oil mist which is formed and contacts the particular moving parts. There are a number of methods which have been taught for providing this oil mist. U.S. Pat. No. 4,003,409 (1977) of Steffens discloses an oil-spraying pump having a fixed piston with axially-oriented bore hole open to the atmosphere located in a moving cylinder which generates an oil mist when the cylinder is moved axially and the bore hole is periodically open. The cylinder is axially displaced by the rotation of a cam connected to the weaving machine. U.S. Pat. No. 3,672,586 (1972) of Morton discloses an apparatus for lubricating a winding machine which utilizes a rotating slinger which projects atomized lubricant upwardly through a duct after which the lubricant flows through channels and passages to lubricate a cam and spindle shaft.

There are a number of problems that exist with the use of an oil mist. These include the oil droplets not being deposited on the parts which are to be lubricated, but remaining suspended in the air and passing into the ambient environment in the form of a stray fog. This fog causes an objectionable contamination of the ambient environment which can result in an undesirable work environment. Also, the consumption of the oil is increased and consequently costs are increased. Additionally, there is a disadvantage of the product such as the woven fabric becoming soiled by the extraneous oil droplets.

A number of methods have been utilized in an attempt to decrease the amount of oil mist which passes into the ambient environment. Canadian Pat. No. 988,041 discloses a coalescing nozzle which produces a liquid spray at its outlet opening consisting substantially of droplets of a size which tend not to remain in suspension in air and of a flow characteristic which avoids dripping of the liquid. U.S. Pat. No. 4,117,869 (1978) of Rushman discloses a method for removing the extraneous oil mist by entraining the fine particles of the lubricant in an air stream and removing the particles from the air stream by the use of an electrostatic filter. U.S. Pat. No. 4,205,708 (1980) of Burgbacher discloses a lubricating system which generates and delivers a programmed sequence of gas (compressed air) pulses and lubricant-mist pulses to the lubricating stations of the textile machine. The pulses are determined by an electronic controller which selectively activates valves in the gas line and the lubricant-mist line. An extractor line is also taught as being positioned at each lubricating station for extracting lubricant-mist and dirt therefrom.

Even though some of the above-described methods do decrease the amount of oil mist which is released into the ambient atmosphere, there is still a significant amount of the mist which does pass into the environment. This material is a particular problem when there are a number of machines operating in close proximity, such as the looms which operate in a typical weaving room. Consequently, there is a need for a method and a system of lubricating a machine which does not utilize an oil mist.

Other methods of applying a lubricant have been disclosed, including in U.S. Pat. No. 4,046,224 (1977) of Smutny the use of a lubricant-impregnated roller which is pressed by spring action against the part to be lubricated. In U.S. Pat. No. 4,155,378 (1979) of Senn, a lubricant impregnated wick is used to contact the shuttle before it passes between the warp yarns. Both of these systems have the disadvantage of not being applicable to the lubrication of rapidly moving parts.

Automated centralized lubricating systems are well known. As discussed by J. B. Wegmann ("Centralized Lubrication Systems," *Power Transmission Design*, Volume 21, No. 3, March 1979, pages 46–50) each lubricating system, regardless of size, consists of a reservoir, pump injector or metering valves, supply lines, feed lines, and a control. It is disclosed that air-operated piston pumps are preferred in the centralized systems because they are self-regulating in that the flow rate is adjusted automatically as pressure changes are felt in supply lines. A control can be used to determine a lubrication cycle which results in periodic lubrication of a particular area. The control can be a time clock which actuates a switch at set intervals for a period of time, or a count control which starts a lubrication cycle after a certain number of events occur. These devices can be used with a three-way solenoid valve to periodically dispense lubricant. E. J. Dorf ("Centralized Systems for Machine Lubrication," *Lubrication Engineering*, Volume 31, No. 5, pages 236–243, 1975) reported the various types of centralized lubricating systems available. These systems include the use of positive displacement devices, orifice metering of oil, orifice metering of oil mist, and require either compressed air or electric motor-operated pumps which are disadvantageous for use in many machines particularly textile weaving machines due to the size of the pump as well as the expense of the particular equipment. Consequently, there is a need for a simplified, automated, continuous lubricating system which can be utilized on a machine and particularly on a textile weaving machine.

Accordingly, it is an object of this invention to provide a simplified method and apparatus for the automatic periodic liquid lubrication of at least one lubricating station of a machine. These and other objects will become apparent from the discussion hereinbelow.

In one embodiment this invention comprises a method for providing periodic liquid lubrication to at least one lubricating station on a machine by generating pressure in a lubricating liquid obtained from a reservoir, passing said liquid irreversibly into an accumulator, maintaining said accumulator under essentially constant pressure by passing a slip stream of said liquid back to said reservoir, passing the remaining liquid through sequential valve to a lubricating station, controlling said sequential valve to provide said liquid lubricant to said station at predetermined intervals, and at all other times, to return said lubricant to said reservoir.

In another embodiment this invention comprises an apparatus for providing periodic liquid lubrication to at least one lubricating station on a machine, said apparatus comprising: a reservoir for containing liquid lubricant; a pressurizing means in said reservoir, said pressurizing means comprising a piston, a chamber adapted to receive said piston, and an adjustable valve adapted to control the pressure in said chamber by varying the flow of lubricating liquid from said chamber to said reservoir; an accumulator; a conduit connecting the pressurizing means and the accumulator; a check valve in said conduit; a splitter; a conduit from the accumulator to the splitter; a conduit from the splitter to the reservoir; a sequential valve; a conduit from the splitter to the sequential valve; a lubricating station; a conduit from the sequential valve to the lubricating station; and a conduit from the sequential valve to the reservoir.

In another embodiment this invention comprises a pressurizing means contained in a reservoir adapted to contain liquid lubricant, said pressurizing means comprising a piston, a chamber adapted to receive said piston, an adjustable valve adapted to control the distance the piston moves into the chamber by varying the flow of liquid from the chamber to the reservoir, and a conduit from said chamber to a lubricating station.

In a further embodiment this invention comprises a method for providing pressurized liquid lubricant, said method comprising reciprocating a piston in a reservoir of liquid lubricant, compressing a portion of said liquid lubricant in a chamber by moving said piston into said chamber, controlling the distance said piston moves into said chamber by varying the flow of liquid from said chamber to said reservoir, withdrawing pressurized liquid from said chamber, said directing said liquid to a desired location.

The instant invention for lubricating a machine has several advantages over the lubricating procedures commonly used. Since liquid lubricant is delivered to the lubricating station, the oil mist discussed hereinabove is eliminated. The amount of liquid lubricant used can be readily controlled to provide sufficient lubrication to moving parts to minimize lubricant waste. Since there is no air or gas used to propel the lubricant in the instant invention, air blockage in the line, i.e. vapor lock, cannot occur (with associated loss of lubrication). Also, with the instant invention, foam formation in the lubricant is minimized, and, therefore, a wider range of lubricants, including detergent oils, can be used. Additionally, the accumulation of water in the system which can occur with air compressor systems is avoided which eliminates corrosion in the system and the need to drain and replace the lubricant. Consequently, the lubricant can be used for a much longer time before being replaced. As discussed in more detail hereinbelow, this invention provides a method for readily cooling the lubricant present in the reservoir during operation of the machine which increases the useful life of the lubricant and reduces cost of operation. This invention also allows warm lubricant to be delivered to the lubricating station which gives more efficient lubrication of the moving parts.

These and other objects and advantages of the invention will become more apparent from the following detailed description taken in conjunction with the drawings, wherein.

Figure 1:
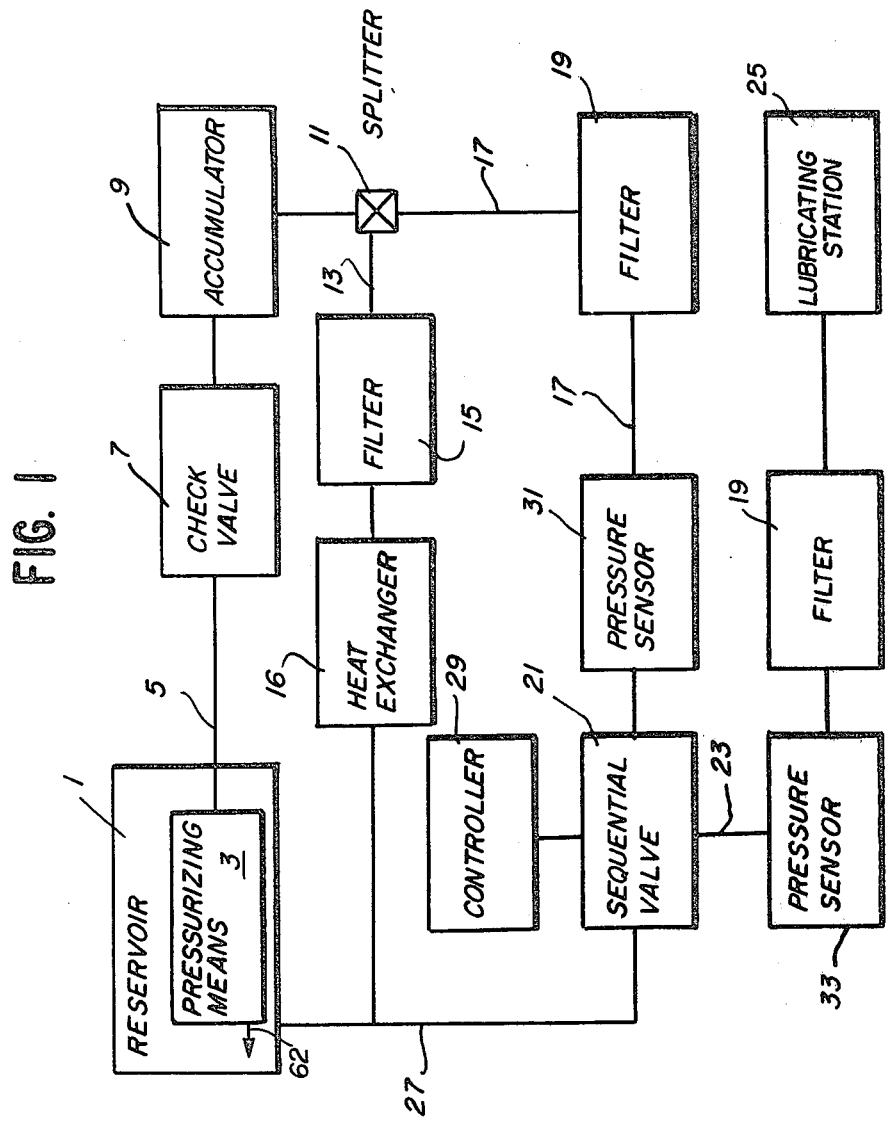
FIG. 1 illustrates a block diagram of the lubricating apparatus of the instant invention.

Referring to FIG. 1, the lubricating apparatus is used to deliver liquid lubricant to at least one lubricating station of a machine. The apparatus has a lubricating reservoir 1 which contains a supply of lubricant sufficient to furnish lubricant to one or more lubricating stations for a convenient period of time as well as provide lubrication to any moving parts located in the reservoir. Preferably, in a textile weaving machine, the lubricant bath in which the cross-shaft, main drive shaft, and oil brake (See FIG. 2) serves as the lubricant reservoir.

Figure 2:
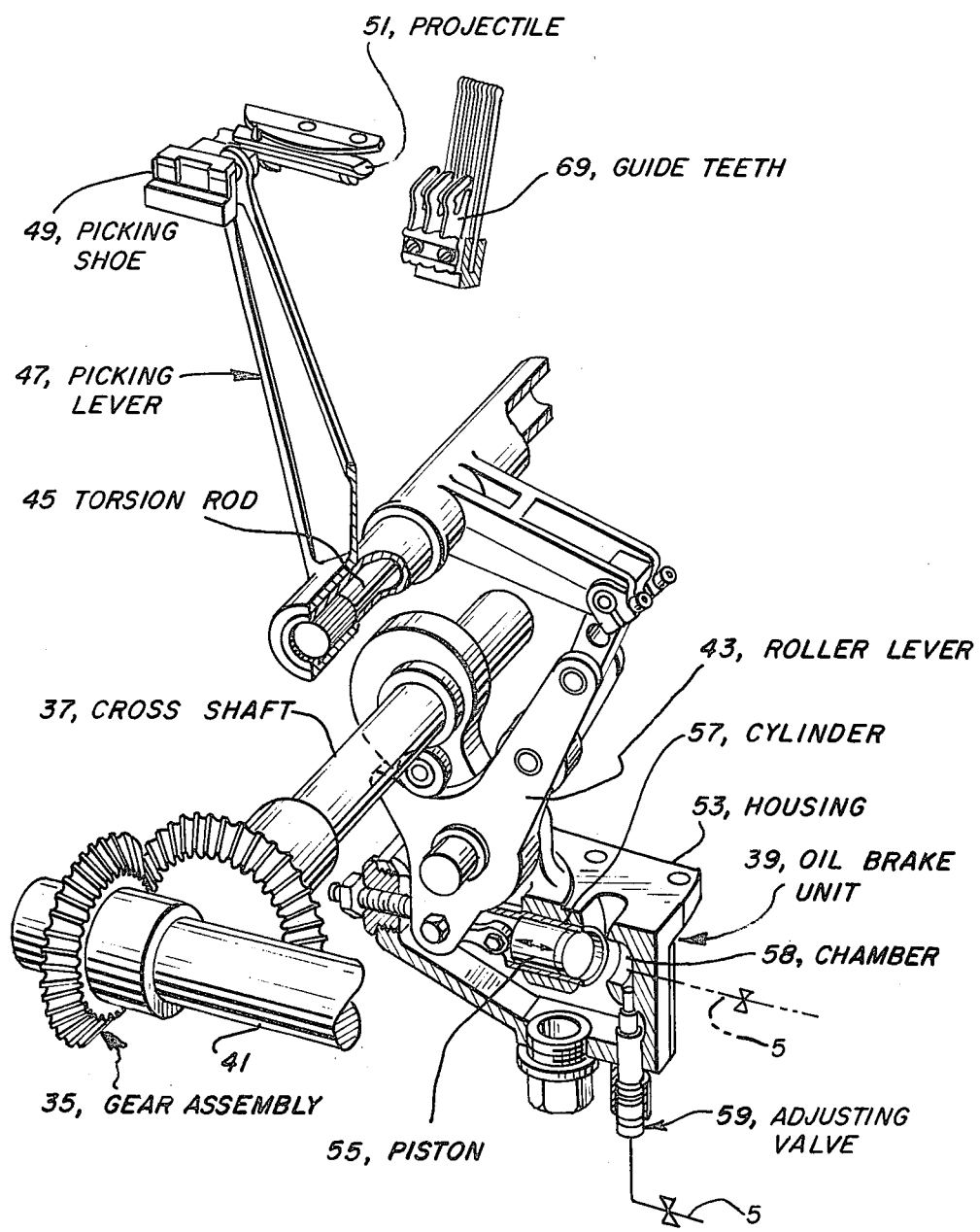
FIG. 2 illustrates the parts involved in the picking motion of a textile weaving machine; and, FIG. 3 illustrates the projectile feed assembly for a textile weaving machine.

A part of the liquid lubricant is pressurized by pressurizing means 3. This pressurizing means is mechanically driven by the machine and has the advantage of avoiding a separate power supply, being more compact and reliable than an individually powered device. The pressurizing means is located in the reservoir 1 and has a piston which reciprocates into and out of a chamber. An adjustable valve communicates with the chamber to allow liquid to flow from the chamber to the reservoir. By varying the quantity of liquid which can flow out of the chamber through this adjusting valve as the piston moves into the chamber, the distance which the piston moves into the chamber can be controlled. A conduit communicates with the chamber to allow a stream of pressurized liquid lubricant to flow from the chamber to a desired location. The oil brake unit shown in FIG. 2 is a preferred example of such a pressurizing means. The operation and particular advantages of this device are discussed in more detail hereinbelow.

A portion of the lubricating liquid which has been pressurized by the pressurizing means 3 passes through a line 5 to a check valve 7 which serves to irreversibly pass the pressurized stream to accumulator 9. The check valve 7 is chosen to function effectively at the operating pressure and keep the lubricating liquid from flowing back to the pressurizing means 3 from accumulator 9.

Accumulator 9 serves to accumulate a volume of pressurized lubricant and need only be of sufficient size to provide a reservoir of pressurized lubricant to supply the lubricating station. Ordinarily, the accumulator is a pressure vessel capable of withstanding up to about 200 pounds per square inch pressure and equipped with a pressure relief valve or rupture disk assembly for safety reasons. This vessel would ordinarily operate with a gas head above the liquid lubricant to provide a pressure cushion to allow easy pressure monitoring with a gas pressure gauge optionally attached to the accumulator and to avoid rapid pressure increase which can occur with liquid-full systems. The accumulator 9 can be located as shown diagramatically in FIG. 1, on one side of a T connector between check valve 7 and splitter 11, or any other functionally convenient location.

The splitter 11 serves to maintain the desired pressure in the lubricating apparatus by allowing a slip stream of lubricating liquid to return to the reservoir through line 13. Since the pressurizing means 3 will ordinarily deliver a constant amount of lubricating liquid, it is necessary to maintain the pressure in the accumulator at the desired level by allowing the slip stream to return to reservoir 1; otherwise, the pressure in the system could increase to unacceptably high levels. The slip stream passing through line 13 can be filtered by using the filter 15 to remove particulates that may be present in the lubricant. Filter 15 is not necessary for the operation of the instant system; however, to minimize particulates in the lubricating liquid in reservoir 1, it is preferred that filter 15 be located in line 13.

Heat exchanger 16 is not critical to the operation of the instant system; however, incorporation of this device into the system allows the liquid lubricant in the reservoir to be cooled. During normal operation of, for example, a weaving machine, the lubricant in the lubricant bath discussed hereinabove is heated by the moving parts and oil brake to a temperature in excess of about 160° F. depending on the speed of the machine. This high temperature results in decreased effective life and lower lubricating efficiency of the lubricant. Therefore, by cooling the lubricant, the time period which the lubricant can be used is increased substantially thereby lowering both the cost of lubricant used and of the machine downtime. The lubricant is ordinarily cooled to about 100° F. since warm lubricant provides more efficient lubrication than cold lubricant. However, if a particular lubricant formulation should provide more efficient lubrication at lower temperatures, this system readily provides for cooling of the lubricant to well below room temperature.

As shown in FIG. 1, the lubricating stream directed toward the lubricating station passes through line 17 to sequential valve 21. Although not necessary for the practice of the instant invention, filter 19 can be incorporated into line 17 or line 23 to remove any particulates which might be present in the liquid lubricant prior to the lubricant reaching lubricating station 25. The use of at least one such filter is preferred if small diameter lines and/or orifices are used in the system. When the filter is located in line 17 it also serves to remove particulates from the liquid lubricant that returns to reservoir 1. Multiple filters can be utilized in the system with one or more filters in line 17 and/or line 23.

Sequential valve 21 receives the stream of lubricating liquid from splitter 11 through line 17. Valve 21 directs the stream of lubricating liquid through line 23 to lubricating station 25 at predetermined intervals, and, at all other times, directs said lubricating liquid toward reservoir 1 through line 27. Sequential valve 21 switches the flow of lubricating liquid between line 23 and line 27 as directed by a controller 29. While any type of valve capable of switching a stream of liquid between several paths can be utilized, a preferred device is a three-way solenoid valve. The three-way solenoid valve can be readily controlled to switch the lubricating liquid stream between lines 23 and 27.

Controller 29 serves to direct sequential valve 21 to switch the stream of lubricating liquid between lines 23 and 27. It is contemplated that any type of programmable sequence controller can be utilized to direct the sequential valve 21. This can be an electronic programmable controller, although the preferred device is a sequence timer which automatically resets after a specified period of time. Proper adjustment of the lubricating sequence can serve to provide adequate lubrication to lubricating station 25 and also minimize the amount of oil which is used and which may become deposited on the fabric being woven.

Lubricating station 25 is located so as to deliver liquid lubricant to the moving parts as necessary. The orifice at the lubricating station can be of any convenient size; but, it has been found that an opening of less than about ¼ inch is sufficient. The lubricating station can also be provided with a device such as a wick which will carry the lubricating liquid to the desired location and provide lubrication for the moving parts. If the orifice at the lubricating station is greater than about 100 mils, it is preferred that line 23 contain a small passage to restrict the flow of liquid lubricant. This passage preferably has an effective diameter of less than about 75 mils and is between pressure sensor 33 (if present) and the lubricating station. If either the lubricating orifice or the passage are less than about 100 mils in diameter, then it is preferred that the lubricating liquid pass through a filter 19 before arriving at the small opening.

It is contemplated that for ease of monitoring the operation of the system and for safeguarding the apparatus to be lubricated that pressure sensors 31 and 33 can optionally be placed in lines 17 and 23 to monitor the pressure of the lubricating liquid. The pressure sensors can be preset to trigger an alarm or a light when the lubricating liquid pressure falls below a certain level. These devices can be connected with a central controlling system such as a computer which could also serve as the controller 29 and thereby provide an overall monitoring system for the lubricating system and further safeguard the lubrication of the textile machine.

FIG. 2 shows the parts involved in the picking motion in a typical textile weaving machine. Commonly, there is an oil bath which surrounds the gear assembly 35, the cross shaft 37, and the oil brake unit 39. In ordinary operation, mechanical energy is transmitted from the main drive shaft 41 to the cross shaft 37 and thereby transferred to the roller lever 43 which acts to distort a torsion rod 45 which thereby stores the energy. This energy is released to the picking lever 47 by allowing the torsion rod to rapidly relax causing picking shoe 49 to impact with a projectile 51 and propelling the projectile carrying the fill yarn across the beam of the textile fabric. The energy transmitted by the torsion rod to the picking lever causes the picking lever to move at a high velocity. Since the picking lever can only travel a short distance, it must be stopped very quickly without damage. This is accomplished by the oil brake unit. The oil brake unit consists of a housing 53 and a brake piston 55 which moves in a reciprocating manner in the piston cylinder 57. During the compression cycle, the piston 55 compresses oil from the oil bath into chamber 58. This compression serves to stop the forward motion of the picking lever in a controlled fashion. The distance which the picking lever 47 travels when it is powered by the torsion rod 45 is controlled by the adjusting valve 59. By controlling the adjusting valve 59, varying amounts of compressed oil 62 can be allowed to pass through the valve and back into the oil reservoir. This allows the distance which the plunger piston 55 travels into chamber 58 to be controlled. This, in turn, controls the distance which the picking lever 47 travels before being stopped by the compressed oil in chamber 58. The action of the brake piston 55 in compressing the oil serves as a source for pressurized lubricant in the instant invention. Pressurized oil may be obtained from chamber 58 through a conduit which is located at any point in chamber 58 which is convenient. Preferably, the pressurized lubricant is withdrawn through a conduit 5 located at a point most distant from the piston 55. Most preferably, the pressurized lubricant is removed through a conduit in the adjusting valve 59.

Figure 3:
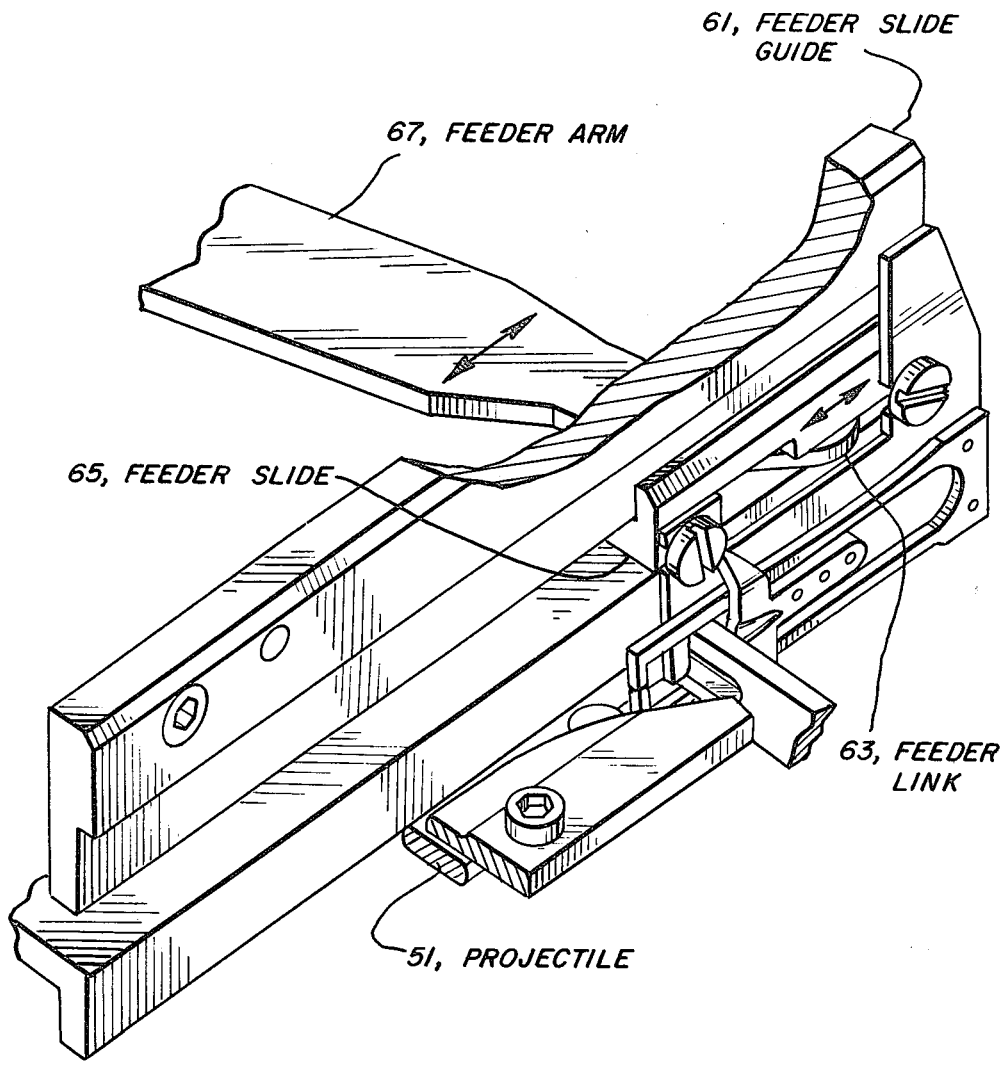

There are a number of parts associated with the picking motion which can be lubricated directly by lubricating stations appropriately located in the equipment. Referring to FIG. 3, the feeder slide guide track 61 can contain orifices which are supplied with pressurized lubricant by line 23. Among the pieces associated with the picking motion which can be directly lubricated by lubricating stations in feeder slide guide 61 are the picking shoe 49 (FIG. 2), feeder slide piece 65, feeder link 63, feeder arm 67, picking link middle guide track, upper guide rail, scissors, and picking shoe guide. It is also convenient to provide for another lubricating station which supplies lubricant to a wick which contacts projectile 51 while on the shuttle conveyor. The lubricant which is transferred to the projectile serves to oil the guide teeth 69 shown in FIG. 2.

In the instant method, liquid lubricant from reservoir 1 is transmitted to pressurizing means 3 and at least a portion of the lubricant is pressurized. When as discussed hereinabove the pressurizing means utilized is the oil brake 39, the stream of pressurized lubricant is ordinarily removed through the adjusting valve 59 and passes by a line 5 containing a check valve 7 to the accumulator 9. The accumulator contains a supply of liquid lubricant sufficient to provide the lubricant to the various lubricating stations. The liquid lubricant in the accumulator is maintained under essentially constant pressure by passing a slip stream of the lubricant back to the reservoir by means of the splitter 11. The lubricant can optionally pass through a filter 15 and also through a heat exchanger 16. The heat exchanger can serve to remove excess thermal energy from the lubricating liquid. The lubricating liquid in reservoir 1 is ordinarily present at a temperature significantly in excess of room temperature because of the mechanical energy which is conveyed to the lubricant during operation of the weaving machine. The high temperature of the lubricating liquid results in a lower useful life of the lubricant as well as decreased deficiency in lubricating the various moving parts. Consequently, the instant method has the added advantage of providing cool, liquid lubricant for reservoir 1. The pressure in the instant system is controlled by the splitter 11. Ordinarily the pressure would be less than about 50 pounds per square inch, although higher pressures could be utilized if desired with the appropriate use of high-pressure equipment. The pressure which is necessary to provide liquid lubricant to the lubrication station 25 depends on several factors, including the speed at which the weaving machine is operating, the type of fabric which is being woven, that is, the type of weave, and the type of material being utilized. Also, the viscosity of the liquid lubricant will affect the pressure necessary, in that higher viscosity liquids will require higher pressure to deliver sufficient liquid lubricant to the lubricating station 25. It is contemplated that in the instant method, it is possible to operate at two or more pressures by utilizing separate accumulators and adjustable bypass systems.

The stream of liquid lubricant which is transmitted from splitter 11 through line 17 is preferably filtered to remove any particulates which could plug the orifice of lubricating station 25. As discussed hereinabove, it is contemplated that the liquid lubricant stream could be filtered either before or after the liquid passes through the sequential valve 21. The quantity of lubricating liquid delivered to lubricating station 25 is determined by the interval at which sequential valve 21 delivers lubricating liquid to line 23. The lubricating interval is controlled by a controller 29 which actuates valve 21 at predetermined intervals to provide the desired lubricating liquid to lubrication station 25. The particular lubricating interval will depend on the type of moving part being lubricated, the speed with which the part is moving, and the type of oil being used. The particular sequence can be readily ascertained by a person skilled in the art. This lubrication method has an added advantage of providing warm lubricating liquid to the lubrication station 25. Lubricating liquid which is slightly above room temperature has superior lubricating properties to that of lubricants provided at or below room temperature. In the interval in which lubricating liquid is not being transmitted to the lubricating station, the sequential valve 21 allows a lubricating liquid to flow through line 27 back to reservoir 1 avoiding a pressure increase in the system downstream from splitter 11.

In the practice of the instant invention, 30 weight oil is provided in the oil bath reservoir of a Sulzer loom. The adjusting screw of the oil brake unit is tapped with a 0.040-inch hole which is adapted to fit a $\frac{1}{8}$-inch pipe thread to a $\frac{1}{4}$-inch line. Pressurized oil with a temperature of about 160° F. passes into the $\frac{1}{4}$-inch line and through a check valve which is oriented to prevent oil from flowing back into the oil brake unit. Pressurized oil is directed into a 15 cubic inch metal vessel which serves as an accumulator for pressurized liquid lubricant. A small gas head is maintained in the vessel and a pressure gauge is used to monitor the pressure in the vessel. The pressure is maintained at about 25 pounds per square inch gauge, which has been found sufficient to provide liquid lubricant to the lubricating stations. The pressure is maintained in the accumulator by means of a $\frac{1}{2}$-inch pressure relief valve which is used to split the oil into two streams. One stream which has a temperature of about 120° F. is returned to the oil reservoir, that is, the picking housing, while the other stream is used to supply liquid lubricant to the lubricating stations. The oil which is directed toward the lubricating stations is passed through a 25-micron filter to remove particulates which might plug the passage contained in the lines to the lubricating stations. The oil stream then flows through a pressure switch which is designed to detect a minimum pressure and give an alarm if the pressure falls below the desired level. The oil stream is then directed to a three-way solenoid valve with $\frac{1}{4}$-inch ports. The solenoid valve is connected to a timer relay which is programmed to actuate the solenoid valve and switch the flow of oil from the lubricating station to a line which returns the oil to the oil reservoir 1. When the solenoid valve is actuated to provide oil to the lubricating station, the stream of oil passes through another pressure switch which is set to provide an alarm if the pressure is below a certain level. This provides a warning should oil cease to flow to the lubricating station and prevents damage to the equipment being lubricating. The oil stream then flows through a passage which restricts the amount of oil flowing to the lubricating station. This serves to minimize oil dripping from the lubricating station orifice. As long as there is sufficient volume in the accumulator, a series of solenoid valves and lubricating stations can be assembled to operate and provide lubricating liquid to a number of lubricating stations.

In the drawings and specification, there has been set forth a preferred embodiment of the invention, and although specific terms are employed, they are used in a generic and descriptive sense only and not for the purposes of limitation.

That which is claimed:

1. A method for providing periodic liquid lubrication to at least one lubricating station on a textile machine said method comprising:
    generating pressure in a liquid lubricant obtained from a reservoir by (a) reciprocating a piston in said reservoir of liquid lubricant, (b) compressing a portion of said liquid lubricant in a chamber by moving said piston into said chamber, (c) withdrawing pressurized liquid lubricant from said chamber, (d) passing remaining liquid lubricant from said chamber directly to said reservoir, and, (e) controlling the distance said piston moves into said chamber by varying the flow of said remaining liquid lubricant from said chamber to said reservoir;

passing said pressurized liquid lubricant irreversibly to an accumulator;

directing said pressurized liquid lubricant from said accumulator to a splitter;

maintaining said accumulator under essentially constant pressure by passing a first stream of pressurized liquid lubricant from said splitter to said reservoir;

directing a second stream of pressurized liquid lubricant from said splitter to a sequential valve; and, controlling said sequential valve to provide said second stream of pressurized liquid lubricant to a lubricating station at predetermined intervals and at all other times to return said second stream of pressurized liquid lubricant to said reservoir.

2. The method of claim 1 wherein said first stream is passed through a filtration zone.

3. The method of claim 1 wherein said first stream is passed through a heat exchanging zone.

4. The method of claim 1 wherein the pressure of said second stream is sensed after said second stream passes through said sequential valve to said lubricating station, and a signal is generated if said pressure is no greater than a preselected level.

5. The method of claim 1 wherein the pressure of said second stream is also sensed before said second stream passes through said sequential valve, and a signal is generated if said pressure is no greater than a preselected level.

6. The method of claim 5 wherein the pressure of said remaining liquid stream is sensed after said stream passes through said sequential valve to said lubricating station, and a signal is generated if said pressure is no greater than a preselected level.

7. An apparatus useful for providing periodic liquid lubrication to at least one lubricating station on a textile machine said apparatus comprising:
  a reservoir for containing liquid lubricant;
  a pressurizing means in said reservoir said pressurizing means comprising
    (a) a piston,
    (b) a chamber adapted to receive said piston, and
    (c) an adjustable valve adapted to control the pressure in said chamber by varying the flow of lubricating liquid from said chamber directly to said reservoir;
  an accumulator;
  a conduit connecting the pressurizing means and the accumulator;
  a check valve in said conduit;
  a splitter;
  a conduit from the accumulator to the splitter;
  a conduit from the splitter to a sequential valve;
  a conduit from the splitter to the reservoir;
  a lubricating station;
  a conduit from the sequential valve to the lubricating station; and,
  a conduit from the sequential valve to the reservoir.

8. The apparatus of claim 7 wherein said conduit from the splitter to the reservoir contains a filter.

9. The apparatus of claim 7 wherein said conduit from the splitter to the reservoir contains a heat exchanger.

10. The apparatus of claim 7 wherein said conduit from the splitter to the sequential valve contains a filter.

11. The apparatus of claim 7 wherein said conduit from the splitter to the sequential valve contains a pressure sensor.

12. The apparatus of claim 7 wherein said conduit from the sequential valve to the lubricating station contains a filter.

13. The apparatus of claim 7 wherein said conduit from the sequential valve to the lubricating station contains a pressure sensor.

14. The apparatus of claim 7 wherein said conduit connecting the pressurizing means and the accumulator passes through said adjustable valve.

15. An apparatus useful for providing periodic liquid lubrication to at least one lubricating station on a textile machine said apparatus comprising:
  a reservoir for containing liquid lubricant;
  a pressurizing means in said reservoir said pressurizing means comprising
    (a) a piston,
    (b) a chamber adapted to receive said piston, and
    (c) an adjustable valve adapted to control the pressure in said chamber by varying the flow of lubricating liquid from said chamber directly to said reservoir;
  an accumulator;
  a first conduit connecting the pressurizing means and the accumulator;
  a check valve in said first conduit;
  a splitter;
  a second conduit connecting the accumulator to the splitter;
  a third conduit connecting the splitter to the reservoir;
  a filter in said third conduit;
  a heat exchanger in said third conduit;
  a sequential valve;
  a fourth conduit connecting the splitter to the sequential valve;
  a filter in said fourth conduit;
  a pressure sensor in said fourth conduit;
  a lubricating station;
  a fifth conduit connecting the sequential valve to the lubricating station;
  a pressure sensor in said fifth conduit; and,
  a sixth conduit connecting the sequential valve to the reservoir.

16. A method for providing periodic liquid lubrication to at least one lubricating station on a textile machine said method comprising:
  generating pressure in a lubricating liquid obtained from a reservoir by
    (a) reciprocating a piston in said reservoir of liquid lubricant,
    (b) compressing a portion of said liquid lubricant in a chamber by moving said piston into said chamber,
    (c) withdrawing pressurized liquid lubricant from said chamber, (d) passing remaining liquid lubricant from said chamber directly to said reservoir, and
(e) controlling the distance said piston moves into said chamber by varying the flow of said remaining liquid lubricant from said chamber to said reservoir;

passing said pressurized liquid lubricant irreversibly to an accumulator;

directing said pressurized liquid lubricant from said accumulator to a splitter;

maintaining said accumulator under essentially constant pressure by passing a first stream of pressurized liquid lubricant from said splitter to said reservoir after passing said first stream through a filtration zone and a heat exchanging zone;

directing a second stream of pressurized liquid lubricant from said splitter through a filtration zone to a sequential valve; and, controlling said sequential valve to provide said second stream of pressurized liquid lubricant to a lubricating station at predetermined intervals and at all other times to return said second stream of pressurized liquid lubricant to said reservoir.

* * * * *